United States Patent
Cook

(10) Patent No.: US 10,551,217 B2
(45) Date of Patent: Feb. 4, 2020

(54) RECEIVER LINE SPACING IN INDUCTIVE POSITION ENCODER

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 49 days.

(21) Appl. No.: 16/024,269

(22) Filed: Jun. 29, 2018

(65) Prior Publication Data

US 2020/0003583 A1     Jan. 2, 2020

(51) Int. Cl.

| | |
|---|---|
| *G01B 7/14* | (2006.01) |
| *G01B 7/30* | (2006.01) |
| *H01F 5/00* | (2006.01) |
| *G01D 5/20* | (2006.01) |
| *G01B 7/00* | (2006.01) |
| *G01B 11/14* | (2006.01) |

(52) U.S. Cl.
CPC ............ *G01D 5/2053* (2013.01); *G01B 7/003* (2013.01); *G01D 5/20* (2013.01); *G01D 5/2013* (2013.01); *G01D 5/2046* (2013.01); *G01B 7/14* (2013.01); *G01B 7/30* (2013.01); *G01B 11/14* (2013.01)

(58) Field of Classification Search
CPC ...... G01D 5/2046; G01D 5/20; G01D 5/2073; G01D 5/2013; G01B 7/003; G01B 7/14; G01B 7/30; G01B 11/14

USPC ..... 324/51, 55, 200, 207.11, 207.15, 207.16, 324/207.17

See application file for complete search history.

(56) References Cited

U.S. PATENT DOCUMENTS

| | | |
|---|---|---|
| 5,841,274 A | 11/1998 | Masreliez et al. |
| 5,886,519 A | 3/1999 | Masreliez et al. |
| 5,894,678 A | 4/1999 | Masreliez et al. |
| 5,973,494 A | 10/1999 | Masreliez et al. |
| 6,002,250 A | 12/1999 | Masreliez et al. |
| 6,011,389 A | 1/2000 | Masreliez et al. |
| 7,906,958 B2 | 3/2011 | Nakayama et al. |
| 2017/0167893 A1* | 6/2017 | Kapner ............... G01D 5/2452 |
| 2018/0003524 A1 | 1/2018 | Cook |

(Continued)

*Primary Examiner* — Raul J Rios Russo
(74) *Attorney, Agent, or Firm* — Seed IP Law Group LLP

(57) ABSTRACT

An electronic position encoder includes a scale comprising a first pattern track of signal modulating elements (SME) periodically arranged at a wavelength $\lambda_1$ and a second pattern track of SME periodically arranged at a wavelength $\lambda_2$, a detector, and a signal processing configuration. The detector includes a field generating coil configuration, a first set of sensing elements configured to provide detector signals based on the first pattern track, and a second set of sensing elements configured to provide detector signals based on the second pattern track. The first set of sensing elements include a first spatial phase subset of sensing elements and a second spatial phase subset of sensing elements that are connected to the signal processing configuration via at least a first pair and a second pair of connection lines that include respective crossover segments that extend across or overlap the second pattern track. The respective crossover segments are positioned at locations spaced apart along a measuring axis direction by a distance $N*\lambda_2$, where N is an integer.

12 Claims, 8 Drawing Sheets

(56) References Cited

U.S. PATENT DOCUMENTS

2018/0113004 A1* 4/2018 Cook ..................... G01D 5/202
2018/0195880 A1* 7/2018 Cook ..................... G01B 3/205

* cited by examiner

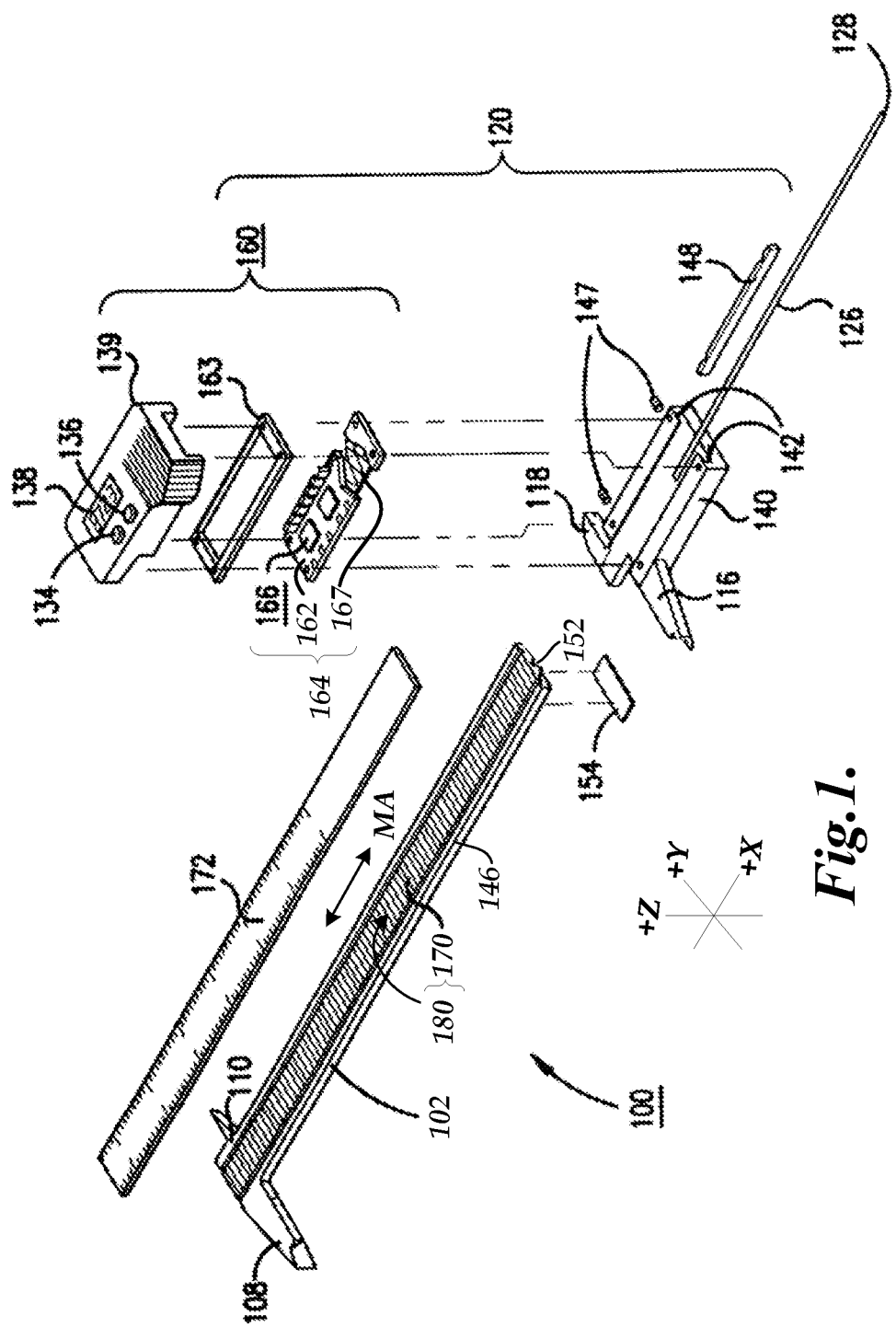

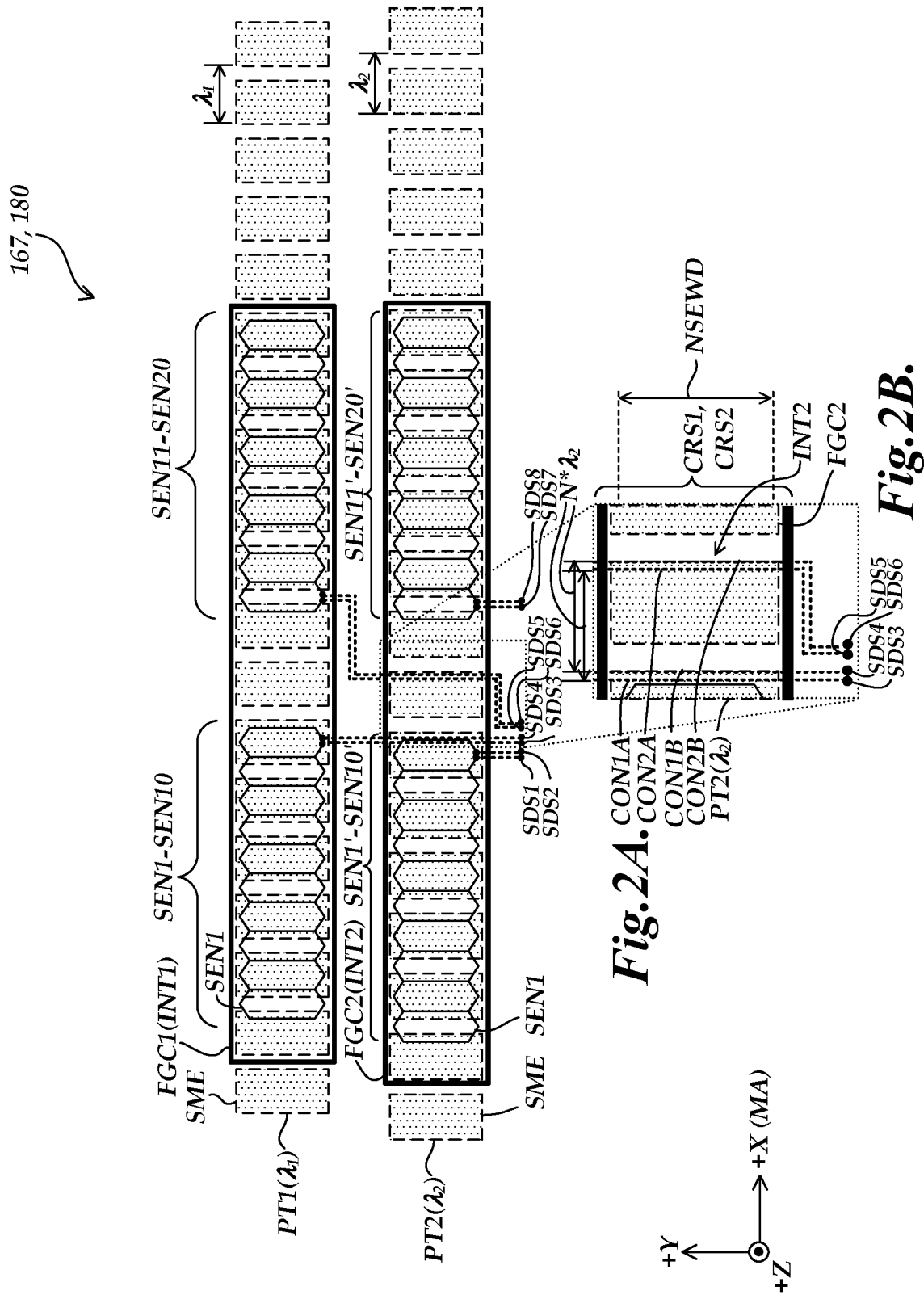

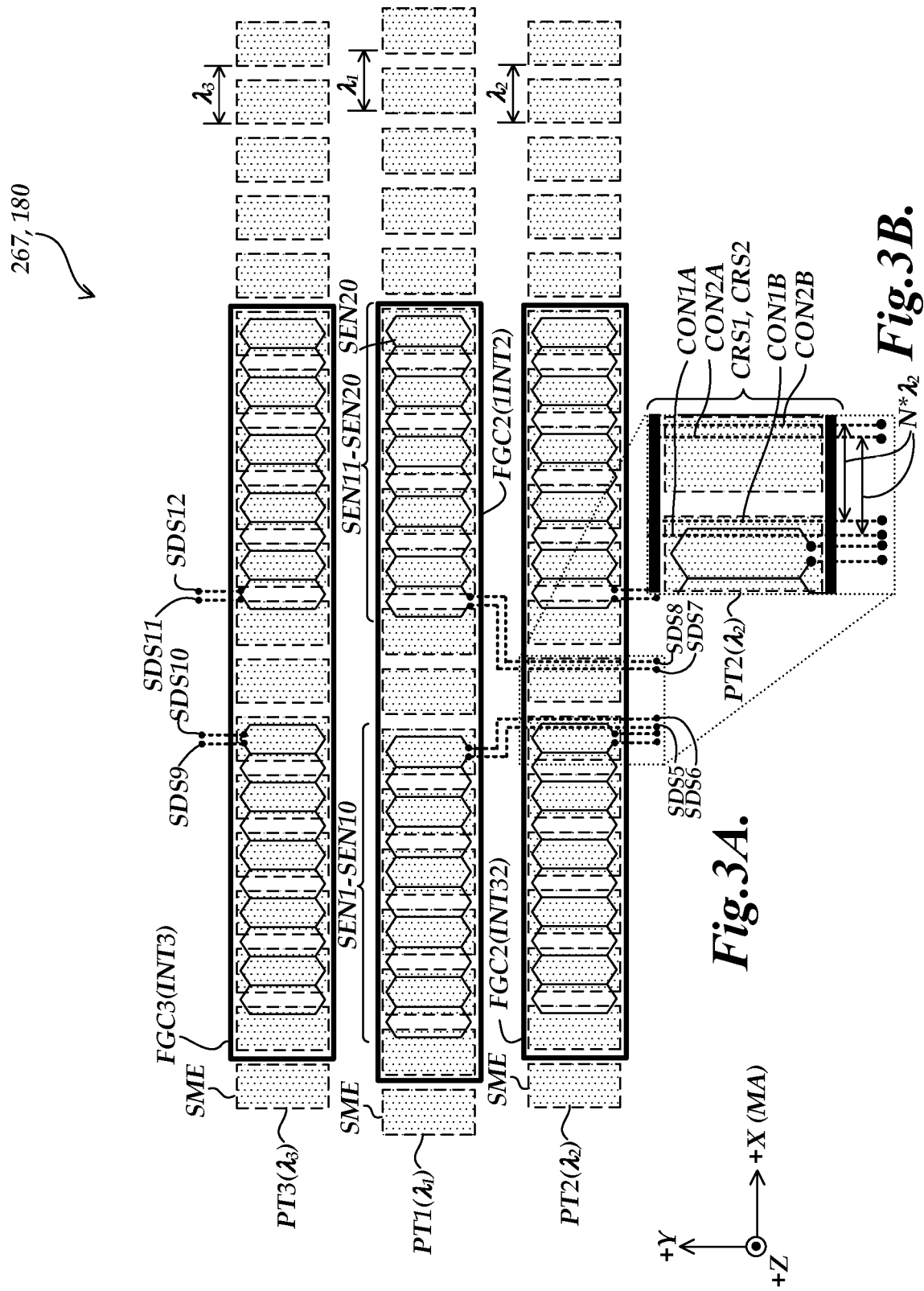

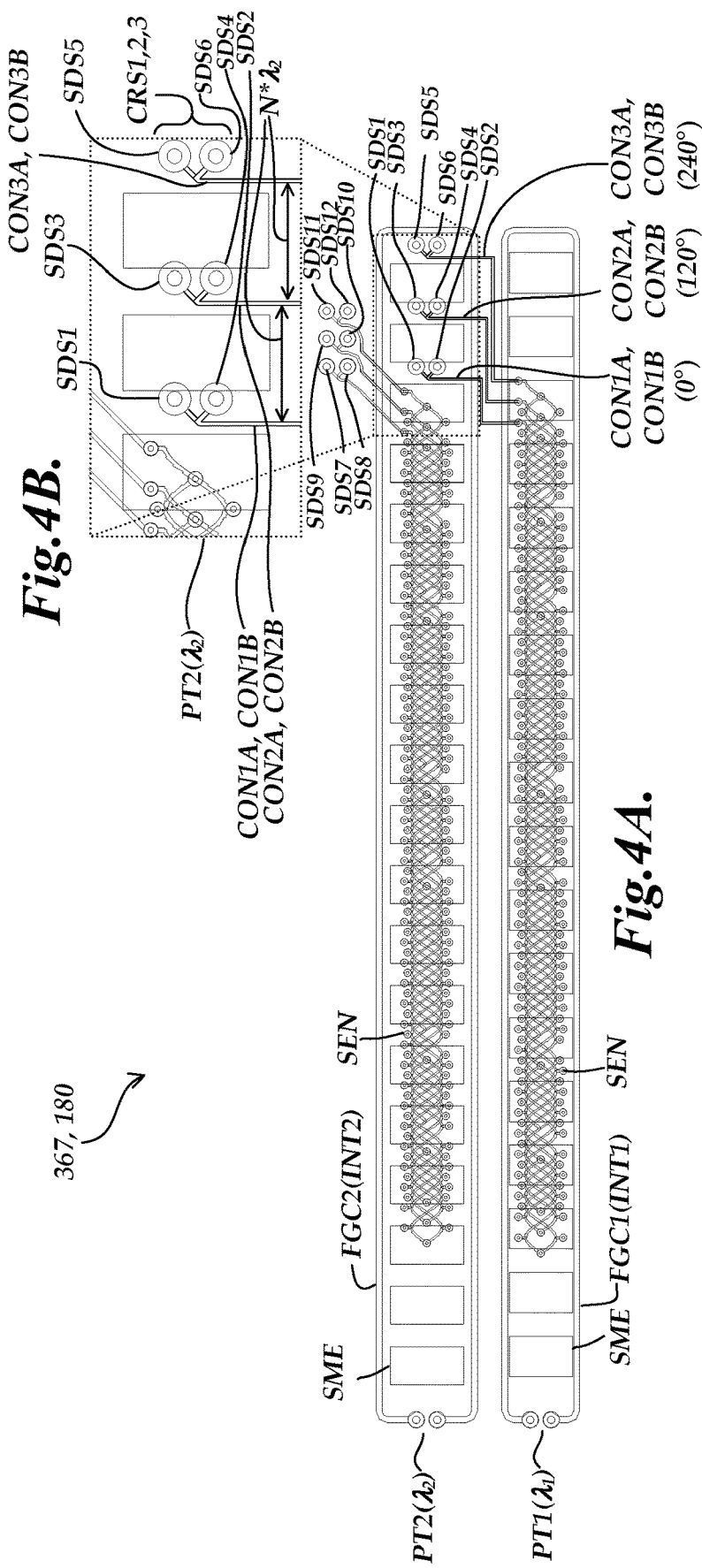

RECEIVER LINE SPACING IN INDUCTIVE POSITION ENCODER

BACKGROUND

Technical Field

This disclosure relates to measurement instruments, and more particularly to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale. Magnetic and inductive transducers are relatively robust to contamination, but not perfectly so.

U.S. Pat. No. 6,011,389 (the '389 patent) describes an induced current position transducer usable in high accuracy applications, U.S. Pat. No. 5,973,494 (the '494 patent) and U.S. Pat. No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 7,906,958 (the '958 patent) describes an induced current position transducer usable in high accuracy applications, wherein a scale having two parallel halves and a plurality of sets of transmitting coils and receiving coils mitigates certain signal offset components that may otherwise produce errors in an induced current position transducer. All of the foregoing are hereby incorporated herein by reference in their entireties. As described in these patents, an induced current transducer may be manufactured using printed circuit board technology and is largely immune to contamination.

However, such systems may be limited in their ability to provide certain combinations of features desired by users, such as combinations of signal strength, compact size, high resolution, cost, robustness to misalignment and contamination, etc. Configurations of encoders that provide improved combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction. In various implementations, the electronic position encoder includes a scale, a detector portion, and a signal processing configuration. The scale extends along the measuring axis direction and includes a signal modulating scale pattern comprising at least a first pattern track and a second pattern track arranged along the measuring axis direction, wherein each pattern track includes signal modulating elements that are arranged to provide a spatially varying characteristic which changes as a periodic function of position along the measuring axis direction.

The detector portion is configured to be mounted proximate to the first pattern track and the second pattern track and to move along the measuring axis direction relative to the first pattern track and the second pattern track.

In various implementations, the detector portion includes a multi-layer printed circuit board (PCB), including a field generating coil configuration (a transmitter) and a plurality of sensing elements (a receiver) fixed on the PCB. The field generating coil configuration includes a first-track field generating coil portion, which defines, by at least partially surrounding, a first interior area aligned with the first pattern track and which generates a first-track changing first magnetic flux in the first interior area in response to a coil drive signal. The field generating coil configuration also includes a second-track field generating coil portion, which defines, by at least partially surrounding, a second interior area aligned with the second pattern track and which generates a second-track changing magnetic flux in the second interior area in response to a coil drive signal.

The detector portion includes the plurality of sensing elements (a receiver) comprising respective conductive receiver loops arranged along the measuring axis direction and fixed on the PCB in alignment with the first and second interior areas. The plurality of sensing elements include a first set of sensing elements configured to provide detector signals which respond to a local effect on the first-track changing magnetic flux provided by adjacent signal modulating elements of the first pattern track, and a second set of sensing elements configured to provide detector signals which respond to a local effect on the second-track changing magnetic flux provided by adjacent signal modulating elements of the second pattern track.

A signal processing configuration is operably connected to the detector portion to provide the coil drive signal for the field generating coil configuration, and determines the relative position between the detector portion and the scale based on detector signals input from the detector portion.

In various implementations, the first pattern track of the scale includes signal modulating elements periodically arranged at a wavelength $\lambda_1$ along the measuring axis direction, and the second pattern track of the scale includes signal modulating elements periodically arranged at a wavelength $\lambda_2$ along the measuring axis direction. The first set of sensing elements (corresponding to the first pattern track) are connected to the signal processing configuration via connection lines which include crossover segments that extend across or overlap the second pattern track. The first set of sensing elements include a first spatial phase subset of sensing elements that is connected to the signal processing configuration via first spatial phase connection lines and a second spatial phase subset of sensing elements that is connected to the signal processing configuration via second spatial phase connection lines. The first spatial phase connection lines comprise at least two connection lines that include respective first spatial phase crossover segments that extend across or overlap the second pattern track. The second spatial phase connection lines comprise at least two connection lines that include respective second spatial phase crossover segments that extend across or overlap the second pattern track. A first pair of first and second spatial phase crossover segments are spaced apart along the measuring axis direction at respective locations separated by a distance $N*\lambda_2$, where N is an integer, and a second pair of first and second spatial phase crossover segments are spaced apart along the measuring axis direction at respective locations separated by a distance $N*\lambda_2$, where N is an integer.

The inventor has discovered that some inductive position encoders, which employ multiple pattern tracks of different wavelengths ($\lambda_1, \lambda_2, \ldots$) suffer from signal contamination due to cross-coupling of signals from the multiple pattern tracks. Ideally the signal from each pattern track should only contain phase information according to its own $\lambda$. However, the signal from a first pattern track of wavelength $\lambda_1$ often contains some signal from a second pattern track of wavelength $\lambda_2$. Such cross-coupling of signals is undesirable as it introduces, among others, error into the encoder's position calculation. The inventor has discovered that some of the cross-coupling issue is caused by a configuration in which receiver lines of one pattern track cross over another pattern track having a different wavelength. The inventor has further discovered that positioning a spatial phase pair of the receiver lines of a first pattern track of wavelength $\lambda_1$, specifically their spatial phase crossover segments that extend across or overlap a second pattern track having a different wavelength of $\lambda_2$, at locations spaced apart by a distance that is an integer multiple of $\lambda_2 (=N*\lambda_2)$ along the measuring axis direction, achieves a significant reduction in cross-coupling of signals thereby improving the overall performance of the encoder transducer. Such receiver line spacing is considered to facilitate negating or canceling common mode error that may otherwise appear due to a second track pattern of a second wavelength ($\lambda_2$), thereby reducing signal contamination in the crossover segments of a spatial phase pair of receiver lines from the first track pattern of a first wavelength ($\lambda_1$) that extend across or overlap the second track pattern.

In various embodiments, the respective first spatial phase crossover segments and second spatial phase crossover segments that extend across or overlap the second pattern track are straight line segments that are oriented perpendicular to the measuring axis direction.

In another aspect of the embodiments, the scale may additionally include a third pattern track arranged along the measuring axis direction, wherein the first pattern track is arranged between the second pattern track and the third pattern track. The field generating coil configuration additionally includes a third-track field generating coil portion, which defines, by at least partially surrounding, a third interior area aligned with the third pattern track and which generates a third-track changing magnetic flux in the third interior area in response to a coil drive signal. The plurality of sensing elements additionally include a third set of sensing elements configured to provide detector signals which respond to a local effect of the third-track changing magnetic flux provided by adjacent signal modulating elements of the third pattern track. The third pattern track includes signal modulating elements periodically arranged at a wavelength $\lambda_3$ along the measuring axis direction. The third set of sensing elements include a first spatial phase subset of sensing elements that is connected to the second set of sensing elements via third spatial phase connection lines and a second spatial phase subset of sensing elements that is connected to the second set of sensing elements via fourth spatial phase connection lines. The third spatial phase connection lines comprise at least two connection lines that include respective first spatial phase crossover segments that extend across or overlap the first pattern track, and the fourth spatial phase connection lines comprise at least two connection lines that include respective second spatial phase crossover segments that extend across or overlap the first pattern track. A first pair of first and second spatial phase crossover segments are spaced apart along the measuring axis direction at respective locations separated by a distance $N*\lambda_1$, where N is an integer, and a second pair of first and second spatial phase crossover segments are spaced apart along the measuring axis direction at respective locations separated by a distance $N*\lambda_1$, where N is an integer.

BRIEF DESCRIPTION OF THE DRAWINGS

FIG. 1 is an exploded isometric view diagram of a hand tool type caliper utilizing an electronic position encoder including a detector portion and a scale.

FIGS. 2A and 2B are plan view diagrams illustrating a first exemplary implementation of a detector portion and a compatible scale pattern usable in an electronic position encoder.

FIGS. 3A and 3B are plan view diagrams illustrating a second exemplary implementation of a detector portion and a compatible scale pattern usable in an electronic position encoder.

FIGS. 4A and 4B are plan view diagrams illustrating a third exemplary implementation of a detector portion and a compatible scale pattern usable in an electronic position encoder.

DETAILED DESCRIPTION

Figure 5A:
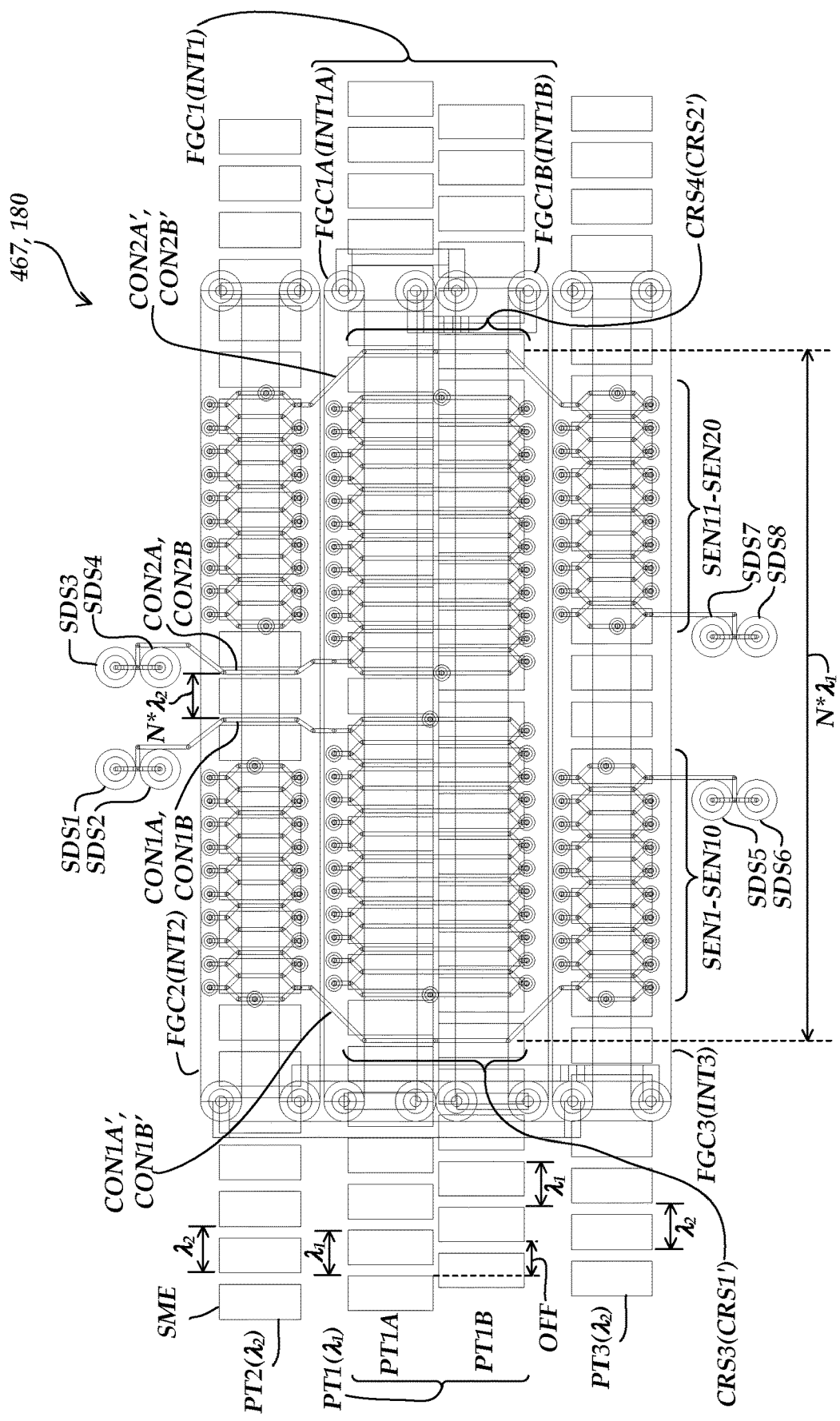
FIGS. 5A, 5B and 5C are plan view diagrams illustrating a fourth exemplary implementation of a detector portion and a compatible scale pattern usable in an electronic position encoder.

FIG. 1 is an exploded isometric view diagram of a hand tool type caliper 100 including a scale member 102 having a spar of roughly rectangular cross-section including a scale 170, and slider assembly 120. In various implementations, the scale 170 may extend along the measuring axis direction MA (e.g., corresponding to an x-axis direction) and may include a signal modulating scale pattern 180. A known type of cover layer 172 (e.g., 100 μm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include an on/off switch 134, a zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which, in this implementation, includes a multi-layer printed circuit board (PCB) 162 that carries a detector portion 167 including a field generating coil configuration and a group of sensing elements (e.g., collectively a field generating and sensing winding configuration) arranged along the measuring axis direction MA, and a signal processing configuration 166 (e.g., a control circuit). A resilient seal 163 may be compressed between the cover 139 and the PCB 162 to exclude contamination from the circuitry and connections. The detector portion 167 may be covered by an insulative coating.

In one specific illustrative example, the detector portion 167 may be arranged parallel with and facing the scale 170, and a front face of the detector portion 167 that faces the scale 170 may be separated from the scale 170 (and/or the scale pattern 180) by a gap on the order of 0.5 mm along the depth (Z) direction. Together, the read head portion 164 and the scale 170 may form a transducer as part of an electronic position encoder. In one implementation, the transducer may be an eddy current transducer which operates by generating changing magnetic fields, wherein the changing magnetic fields induce circulating currents, known as eddy currents, in some of the signal modulating elements of the scale pattern 180 that are placed within the changing magnetic field, as will be described in more detail below. It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, and robustness to contamination, etc. Even small improvements in any of these factors are highly desirable, but difficult to achieve, especially in light of the design constraints imposed in order to achieve commercial success in the various applications. The principles disclosed in the following description provide improvements in a number of these factors in a particularly cost effective and compact manner.

FIGS. 2A and 2B are plan view diagrams of a first exemplary implementation usable as the detector portion 167 and the signal modulating scale pattern 180 in the electronic position encoder shown in FIG. 1, or the like. FIGS. 2A and 2B may be regarded as partly representational, partly schematic. An enlarged section of the detector portion 167 and scale pattern 180 in FIG. 2A is illustrated in FIG. 2B. In FIGS. 2A and 2B, the various elements described below are represented by their shape or outline, and are shown superimposed on one another to emphasize certain geometric relationships. It should be understood that various elements may reside on different fabrication layers located at different planes along the z-axis direction (into the plane of FIGS. 2A and 2B) as needed to provide various operating gaps and/or insulating layers, as will be apparent to one of ordinary skill in the art based on the following description. In particular, according to exemplary embodiments, a first-track field generating coil portion FGC1 and a second-track field generating coil portion FGC2 comprise conductive traces fabricated using one or more transmitter copper layers of the PCB, and conductive receiver loops which form a set of sensing elements SEN1-SEN20 corresponding to a first pattern track PT1 of wavelength $\lambda_1$ and conductive loops which form a set of sensing elements SEN1'-SEN20' corresponding to a second pattern track PT2 of wavelength $\lambda_2$ may comprise conductive traces fabricated using one or more receiver copper layers of the PCB.

The illustrated portion of the scale pattern 180 includes the first pattern track PT1 and the second pattern track PT2, each including signal modulating elements SME shown in dashed outline, which are located on the scale 170 (shown in FIG. 1). The signal modulating elements SME are arranged to provide a spatially varying characteristic which changes as a periodic function of position along the measuring axis direction MA. In the first pattern track PT1 the signal modulating elements SME are arranged periodically at a wavelength $\lambda_1$ along the measuring axis direction MA. In the second pattern track PT2 the signal modulating elements SME are arranged periodically at a wavelength $\lambda_2$ along the measuring axis direction MA. It will be appreciated that the scale pattern 180 moves relative to the detector portion 167 during operation, as may be seen in FIG. 1.

In the example of FIGS. 2A and 2B, the scale pattern 180 comprises discrete signal modulating elements SME that are arranged periodically along the measuring axis direction MA (e.g., corresponding to an x-axis direction). However, more generally the scale pattern 180 may comprise various alternative spatially modulated patterns including discrete elements or one or more continuous pattern element(s), provided that the pattern has a spatial characteristic which changes as a function of position along the x-axis direction, so as to provide position dependent detector signals arising in the sensing elements SEN of the detector portion 167, according to known methods.

In various implementations, the detector portion 167 is configured to be mounted proximate to the first pattern track PT1 and the second pattern track PT2, and to move along the measuring axis direction MA relative to the first pattern track PT1 and the second pattern track PT2. The detector portion 167 includes a field generating configuration, which comprises the first-track field generating coil portion FGC1 and the second-track field generating coil portion FGC2. The first-track field generating coil portion FGC1 defines, by at least partially surrounding, a first interior area INT1 aligned with the first pattern track PT1, and generates a first-track changing magnetic flux in the first interior area INT1 in response to a coil drive signal supplied to the first-track field generating coil portion FGC1. The second-track field generating coil portion FGC2 defines, by at least partially surrounding, a second interior area INT2 aligned with the second pattern track PT2, and generates a second-track changing magnetic flux in the second interior area INT2 in response to a coil drive signal supplied to the second-track field generating coil portion FGC2.

In various implementations, the first-track field generating coil portion FGC1 and the second-track field generating coil portion FGC2 may comprise a single turn surrounding the corresponding interior area INT1 and INT2. In some embodiments, the first-track field generating coil portion FGC1 and the second-track field generating coil portion FGC2 are part of a single loop which defines both the first interior area INT1 and the second interior area INT2.

The various sensing elements SEN1-SEN20 and SEN1'-SEN20', the first-track field generating coil portion FGC1 and the second-track field generating coil portion FGC2 may be fixed on a substrate (e.g., PCB 162 of FIG. 1). In various implementations, the first-track field generating coil portion FGC1 and the second-track field generating coil portion FGC2 are insulated from the corresponding sets of sensing elements SEN1-SEN20 and SEN1'-SEN20' (e.g., as located in different layers of a PCB).

The plurality of sensing elements SEN may take a variety of alternative configurations to be used in combination with a variety of corresponding signal processing schemes in various embodiments, as will be understood by one skilled in the art. FIGS. 2A and 2B show two representative sets of sensing elements SEN1-SEN20 and SEN1'-SEN20' corresponding to the first-track field generating coil portion FGC1 and the second-track field generating coil portion FGC2, respectively. The sensing elements SEN in this particular embodiment comprise conductive receiver loops (alternatively may be referred to as sensing loop elements, sensing coil elements or sensing winding elements) arranged in a first spatial phase subset SEN1-10 (or SEN1'-10') which are connected in series, and a second spatial phase subset SEN11-20 (or SEN11'-20') which are connected in series.

The first set of sensing elements SEN1-SEN20 corresponding to the first pattern track PT1 are configured to provide detector signals which respond to a local effect on the first-track changing magnetic flux provided by adjacent modulating elements of the first pattern track PT1. The second set of sensing elements SEN1'-SEN20' corresponding to the second pattern track PT1 are configured to provide detector signals which respond to a local effect on the second-track changing magnetic flux provided by adjacent modulating elements of the second pattern track PT2. In this embodiment, in each of the first and second sets of sensing elements SEN1-SEN20 and SEN1'-SEN20' corresponding to the first and second pattern tracks PT1 and PT2, adjacent loop elements are connected by a configuration of conductors on various layers of PCB connected by feedthroughs according to known methods such that they have opposite winding polarities. That is, if a first loop responds to a changing magnetic field with a positive polarity detector signal contribution, then the adjacent loops respond with a negative polarity detector signal contribution. In this particular embodiment, the sensing elements are connected in series such that their detector signals or signal contributions are summed, and a "summed" detector signal is output at the detector signal output connections SDS1-SDS8 from the first and second set of sensing elements SEN1-SEN20 and SEN1'-SEN20' corresponding to the first and second pattern tracks PT1 and PT2, to a signal processing configuration (not shown). The signal processing configuration (e.g., the signal processing configuration 166 of FIG. 1, or a signal processing configuration 766 of FIG. 6 to be described below, etc.), which is operably connected to the detector portion 167, is configured to provide the coil drive signal to the first-track field generating coil portion FGC1 and the second-track field generating coil portion FGC2, and to determine the relative position between the detector portion 167 and the scale 170 based on the detector signals input from the detector portion 167 (via the connections SDS1-SDS8).

It should be appreciated that the configurations of sensing elements described herein are exemplary only, and not limiting. As one example, individual sensing element loops may output individual signals to a corresponding signal processing configuration in some embodiments, for example as disclosed in commonly assigned U.S. Pat. App. Pub. No. 2018/003524, which is hereby incorporated by reference in its entirety. More generally, various known sensing element configurations may be used in combination with the principles disclosed and claimed herein, for use in combination with various known scale pattern and signal processing schemes, in various embodiments.

As described above, in the first pattern track PT1 the signal modulating elements SME are periodically arranged at a wavelength $\lambda_1$ along the measuring axis direction MA, and in the second pattern track PT2 the signal modulating elements SME are periodically arranged at a wavelength $\lambda_2$ along the measuring axis direction MA. As best shown in FIG. 2B, the first set of sensing elements SEN1-SEN20 corresponding to the first pattern track PT1 are connected to the signal processing configuration via connection lines which include crossover segments that extend across or overlap the second pattern track PT2. The first set of sensing elements SEN1-SEN20 corresponding to the first pattern track PT1 include a first spatial phase subset of sensing elements SEN1-SEN10 that is connected to the signal processing configuration via first spatial connection lines and a second spatial phase subset of sensing elements SEN11-SEN20 that is connected to the signal processing configuration via second spatial connection lines. The first spatial connection lines comprise at least two connection lines CON1A and CON1B that include respective first spatial phase crossover segments CRS1 that extend across or overlap the second pattern track PT2, and the second spatial phase connection lines comprise at least two connection lines CON2A and CON2B that include respective second spatial phase crossover segments CRS2 that extend across or overlap the second pattern track PT2. A first pair of first and second spatial phase crossover segments CRS1 and CRS2 (corresponding to CON1A and CON2A) are spaced apart along the measuring axis direction at respective locations separated by a distance that is an integer multiple of wavelength $\lambda_2$ of the second pattern track PT2 ($=N*\lambda_2$, where N is an integer), and a second pair of first and second spatial phase crossover segments CRS1 and CRS2 (corresponding to CON1B and CON2B) are spaced apart along the measuring axis direction at respective locations separated by a distance that is an integer multiple of wavelength $\lambda_2$ of the second pattern track PT2 ($=N*\lambda_2$, where N is an integer).

In various implementations, a signal processing portion may be configured to determine a difference between a signal provided by the first spatial phase subset of sensing elements SEN1-SEN10 and a signal provided by the second spatial phase subset of sensing elements SEN11-SEN20 in order to subtract out any common-mode signal coupling between the first pair of first and second spatial phase crossover segments CRS1 and CRS2 and between the second pair of first and second spatial phase crossover segments CRS1 and CRS2.

In various implementations, at least a majority of the respective conductive receiver loops forming the sensing elements SEN have a nominal sensing element width dimension NSEWD along a direction perpendicular to the measuring axis direction MA that spans the corresponding interior area INT, as illustrated in FIG. 2B. In various implementations, the nominal sensing element width dimension NSEWD of the sensing elements SEN may be greater than a dimension across the corresponding interior area INT along the direction perpendicular to the measuring axis direction MA (as shown in FIG. 5B to be described later), and at least a majority of the sensing elements SEN may overlap the corresponding field generating coil portion FGC, as also shown in FIG. 5B later.

As illustrated in FIG. 2B, in various implementations, the respective crossover segments CRS1 and CRS2 that extend across or overlap the second pattern track PT2 are straight line segments that are oriented perpendicular to the measuring axis direction MA.

Positioning a spatial phase pair of the receiver lines of a first pattern track of wavelength $\lambda_1$, specifically their crossover segments that extend across or overlap a second pattern track having a different wavelength of $\lambda_2$, at locations spaced apart by a distance that is an integer multiple of $\lambda_2(=N*\lambda_2)$, is discovered to achieve a significant reduction in cross-coupling of signals between different pattern tracks having different wavelengths, thereby improving the overall performance of the encoder transducer.

As described above with respect to FIG. 1, in various implementations the detector portion 167 may be included in various types of measurement instruments (e.g., calipers, micrometers, gauges, linear scales, etc.). For example, the detector portion 167 may be fixed to a slide member, and the scale pattern 180 may be fixed to a beam member having a measuring axis that coincides with an x-axis direction. In such a configuration, the slide member may be movably mounted on the beam member and movable along the measuring axis direction MA in a plane that extends along the x-axis direction and a y-axis direction, with a z-axis direction being orthogonal to the plane.

FIGS. 3A and 3B are plan view diagrams illustrating a second exemplary implementation of a detector portion 267 usable as the detector portion 167 and the signal modulating scale pattern 180 in the electronic position encoder shown in FIG. 1, or the like. The detector portion 267 has characteristics and components similar to the detector portion 167 of FIGS. 2A and 2B and may be understood to operate similarly, except as otherwise indicated below, and is configured to fulfill various design principles disclosed herein. An enlarged section of the detector portion 267 and the scale pattern 180 in FIG. 3A is illustrated in FIG. 3B.

Similarly to the embodiment of FIG. 2A, the embodiment illustrated in FIG. 3A includes the first pattern track PT1 having wavelength $\lambda_1$ corresponding to the first-track field generating coil portion FGC1 and the second pattern track PT2 having wavelength $\lambda_2$ corresponding to the second-track field generating coil portion FGC2, wherein the first pair of first and second spatial phase crossover segments CRS1 and CRS2 (corresponding to CON1A and CON2A) are spaced apart along the measuring axis direction at respective locations separated by a distance that is an integer multiple of wavelength $\lambda_2$ of the second pattern track PT2 ($=N*\lambda_2$, where N is an integer), and a second pair of first and second spatial phase crossover segments CRS1 and CRS2 (corresponding to CON1B and CON2B) are spaced apart along the measuring axis direction at respective locations separated by a distance that is an integer multiple of wavelength $\lambda_2$ of the second pattern track PT2 ($=N*\lambda_2$ where N is an integer) The detector portion 267 of FIG. 3A additionally includes a third pattern track PT3 arranged along the measuring axis direction MA and including signal modulating elements SME that are arranged to provide a spatially varying characteristic which changes as a periodic function of position along the measuring axis direction MA. As illustrated, the first pattern track PT1 is arranged (interposed) between the second pattern track PT2 and the third pattern track PT3.

The detector portion 267 is configured to be mounted proximate to the first pattern track PT1, the second pattern track PT2 and the third pattern track PT3 and to move along the measuring axis direction relative to the first pattern track PT1, the second pattern track PT2 and the third pattern track PT3. The field generating coil configuration additionally includes a third-track field generating coil portion FGC3, which defines, by at least partially surrounding, a third interior area INT3 aligned with the third pattern track PT3 and which generates a third-track changing magnetic flux in the third interior area INT3 in response to a coil drive signal supplied to the third-track field generating coil portion FGC3. The plurality of sensing elements SEN additionally include a third set of sensing elements configured to provide detector signals (output at detector signal output connections SDS9-SDS12) which respond to a local effect of the third-track changing magnetic flux provided by adjacent signal modulating elements SME of the third pattern track PT3. The third pattern track PT3 includes signal modulating elements SME periodically arranged at a wavelength $\lambda_3$ along the measuring axis direction MA, and the third set of sensing elements are connected to the signal processing configuration (not shown) via connection lines coupled to the detector signal output connections SDS9-SDS12. Wavelength $\lambda_3$ of the third pattern track PT3 may be the same as or different from wavelength $\lambda_1$ of the first pattern track PT1. In such an implementation, yaw errors may be reduced. Wavelength $\lambda_3$ of the third pattern track PT3 may be the same as or different from wavelength $\lambda_2$ of the second pattern track PT2.

FIGS. 4A and 4B are plan view diagrams illustrating a third exemplary implementation of a detector portion 367 and a compatible scale pattern 180 usable in the electronic position encoder shown in FIG. 1, or the like. The detector portion 367 has characteristics and components similar to the detector portions 167 and 267 of FIGS. 2A-3B and may be understood to operate similarly, except as otherwise indicated below, and is configured to fulfill various design principles disclosed herein. An enlarged section of the detector portion 367 and the scale pattern 180 in FIG. 4A is illustrated in FIG. 4B. As before, it should be understood that various elements may reside on different fabrication layers located at different planes along the z-axis direction, as needed to provide various operating gaps and/or insulating layers.

As with the previous embodiments, the embodiment illustrated in FIG. 4A includes the first pattern track PT1 having wavelength $\lambda_1$ corresponding to the first-track field generating coil portion FGC1 and the second pattern track PT2 having wavelength $\lambda_2$ corresponding to the second-track field generating coil portion FGC2. Also as with the previous embodiments, the first set of sensing elements corresponding to the first pattern track PT1 are connected to the signal processing configuration via connection lines which include crossover segments that extend across or overlap the second pattern track PT2. The first set of sensing elements corresponding to the first pattern track PT1 include a first spatial phase subset of sensing elements that is connected to the signal processing configuration via first spatial connection lines and a second spatial phase subset of sensing elements that is connected to the signal processing configuration via second spatial connection lines. The first spatial connection lines comprise at least two connection lines CON1A and CON1B that include respective first spatial phase crossover segments CRS1 that extend across or overlap the second pattern track PT2, and the second spatial phase connection lines comprise at least two connection lines CON2A and CON2B that include respective second spatial phase crossover segments CRS2 that extend across or overlap the second pattern track PT2. A first pair of first and second spatial phase crossover segments CRS1 and CRS2 (corresponding to CON1A and CON2A) are spaced apart along the measuring axis direction at respective locations separated by a distance that is an integer multiple of wavelength $\lambda_2$ of the second pattern track PT2 ($=N*\lambda_2$, where N is an integer), and a second pair of first and second spatial phase crossover segments CRS1 and CRS2 (corresponding to CON1B and CON2B) are spaced apart along the measuring axis direction at respective locations separated by a distance that is an integer multiple of wavelength $\lambda_2$ of the second pattern track PT2 ($=N*\lambda_2$ where N is an integer).

Unlike the detector portions 167 and 267 described above, however, in the detector portion 367, the first set of sensing elements SEN corresponding to the first pattern track PT1 additionally include a third spatial phase subset of sensing elements that is connected to the signal processing configuration via third connection lines CON3A and CON3B. The third connection lines CON3A and CON3B include respective crossover segments CRS3 that extend across or overlap the second pattern track PT2. A first pair of second and third spatial phase crossover segments CRS2 and CRS3 (corresponding to CON2A and CON3A) are spaced apart along the measuring axis direction at respective locations separated by a distance that is an integer multiple of wavelength $\lambda_2$ of the second pattern track PT2 (=N*$\lambda_2$ where N is an integer), and a second pair of second and third spatial phase crossover segments CRS2 and CRS3 (corresponding to CON2B and CON3B) are spaced apart along the measuring axis direction at respective locations separated by a distance that is an integer multiple of wavelength $\lambda_2$ of the second pattern track PT2 (=N*$\lambda_2$ where N is an integer).

Thus, in this embodiment, the first spatial phase connection lines CON1A and CON1B, the second spatial phase connection lines CON2A and CON2B, and the third spatial phase connection lines CON3A and CON3B are positioned at locations spaced apart by a distance that is an integer multiple of wavelength $\lambda_2$ of the second pattern track PT2. Such configuration may be applied, for example, in a three-phase (three-channel) encoder wherein the first spatial phase connection lines CON1A and CON1B correspond to 0° phase receiver lines, the second spatial phase connection lines CON2A and CON2B correspond to 120° phase receiver lines, and the third spatial phase connection lines CON3A and CON3B correspond to 240° phase receiver lines. It should be appreciated that in FIG. 4A and FIG. 4B, the first spatial phase connection lines CON1A and CON1B may be understood to be stacked on different layers of a PCB, whereas the first spatial phase connection lines CON1A and CON1B shown in FIGS. 2A, 2B, 3A, and 3C are shown adjacent to each other. Similarly, the second connection lines CON2A and CON2B are shown as stacked in FIG. 4A and FIG. 4B, and so are the third spatial phase connection lines CON3A and CON3B.

Figure 5B:
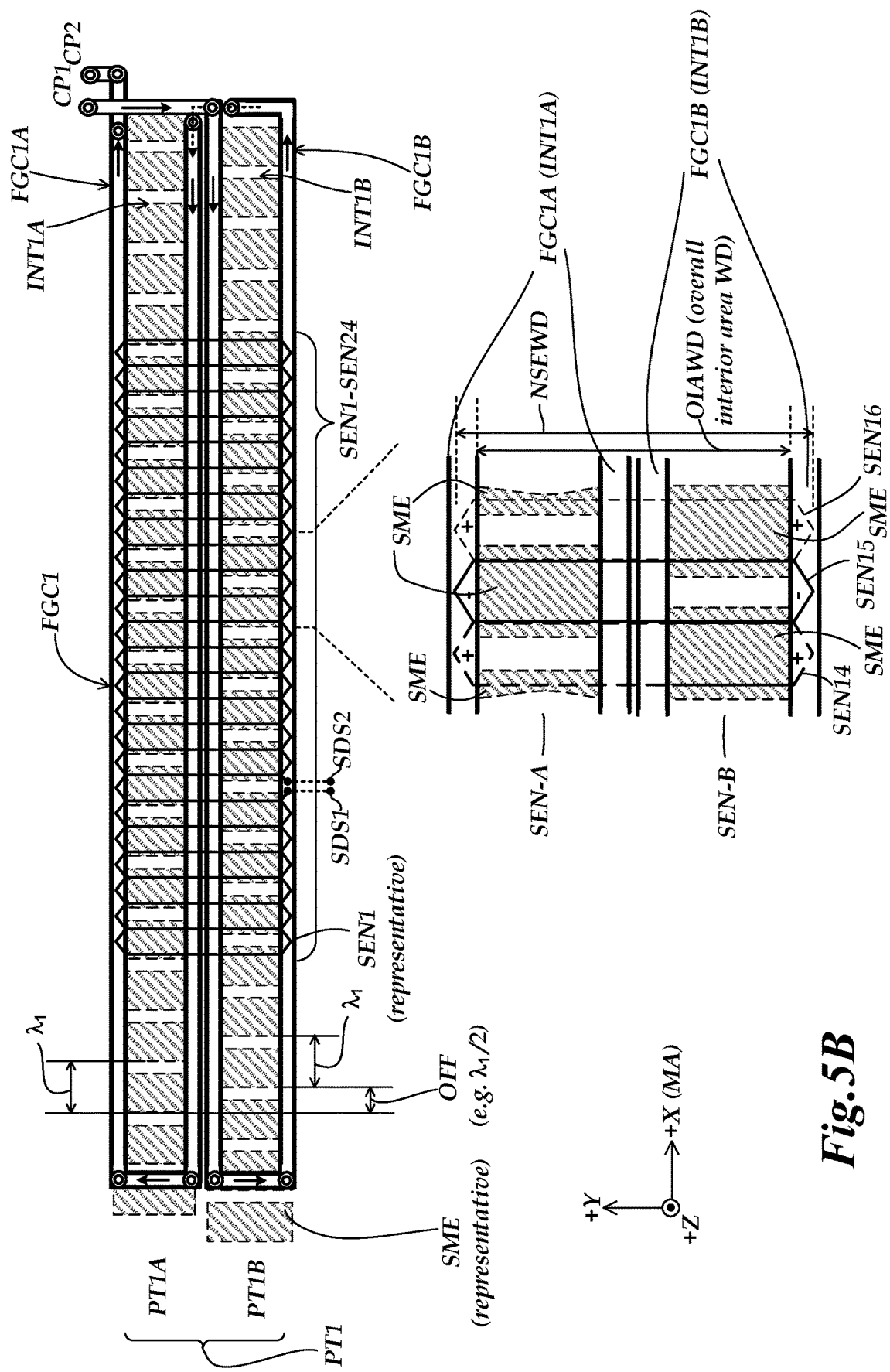
Figure 5C:
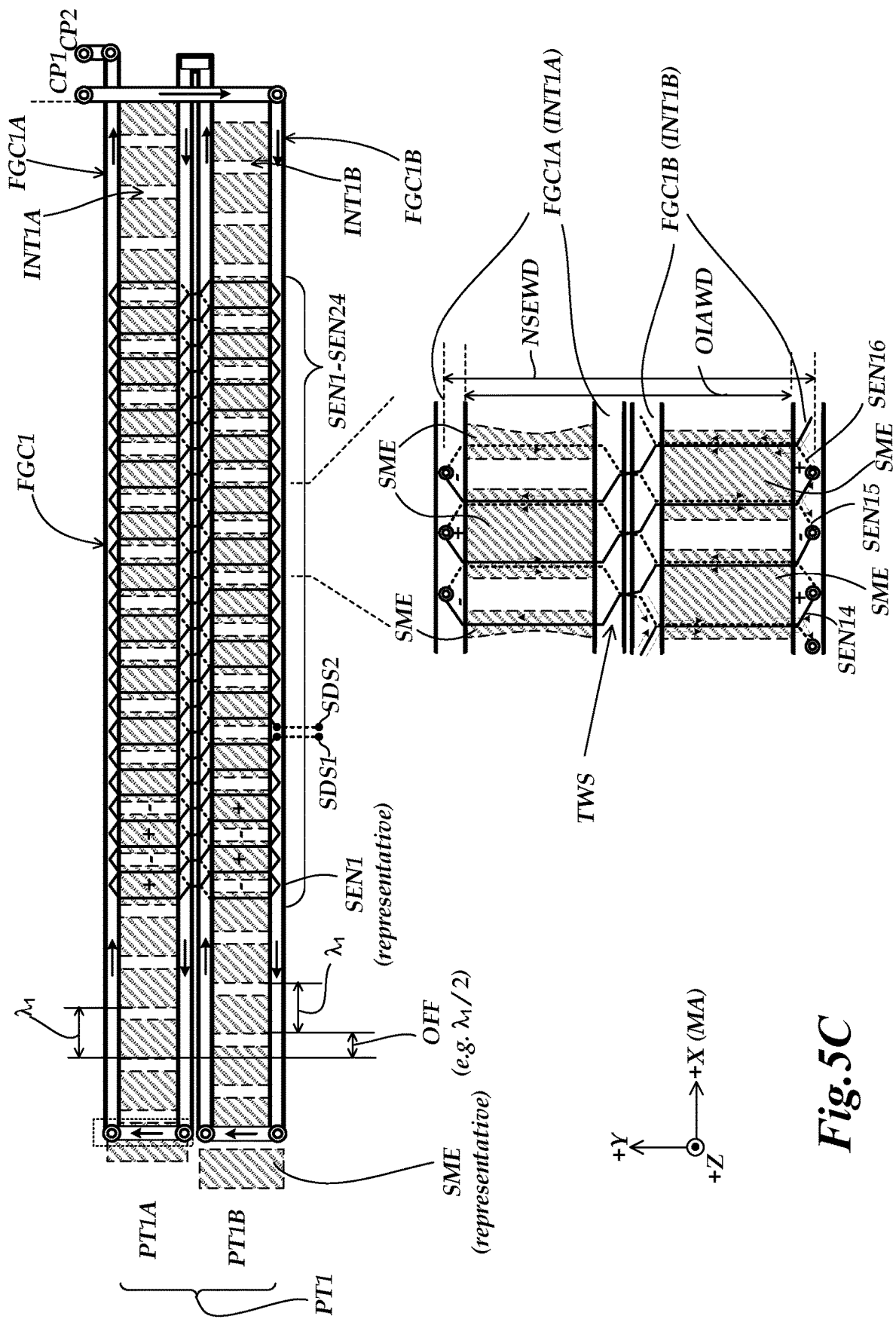

FIGS. 5A, 5B and 5C are plan view diagrams illustrating a fourth exemplary implementation of a detector portion 467 and a compatible scale pattern 180 usable in the electronic position encoder in FIG. 1, or the like. The detector portion 467 has characteristics and components similar to the detector portions 167, 267 and 367 of FIGS. 2A-4B and may be understood to operate similarly, except as otherwise indicated below, and is configured to fulfill various design principles disclosed herein. It should be understood that various elements may reside on different fabrication layers located at different planes along the z-axis direction, as needed to provide various operating gaps and/or insulating layers.

As with the previous embodiments, the embodiment illustrated in FIG. 5A includes the first pattern track PT1 having wavelength $\lambda_1$ corresponding to the first-track field generating coil portion FGC1 and the second pattern track PT2 having wavelength $\lambda_2$ corresponding to the second-track field generating coil portion FGC2. Also as with the previous embodiments, the first set of sensing elements SEN1-SEN24 corresponding to the first pattern track PT1 are connected to the signal processing configuration via connection lines which include crossover segments that extend across or overlap the second pattern track PT2. The first set of sensing elements SEN1-SEN24 corresponding to the first pattern track PT1 include a first spatial phase subset of sensing elements SEN1-SEN12 that is connected to the signal processing configuration via first spatial connection lines and a second spatial phase subset of sensing elements SEN13-SEN24 that is connected to the signal processing configuration via second spatial connection lines. The first spatial connection lines comprise at least two connection lines CON1A and CON1B that include respective first spatial phase crossover segments CRS1 that extend across or overlap the second pattern track PT2, and the second spatial phase connection lines comprise at least two connection lines CON2A and CON2B that include respective second spatial phase crossover segments CRS2 that extend across or overlap the second pattern track PT2. A first pair of first and second spatial phase crossover segments CRS1 and CRS2 (corresponding to CON1A and CON2A) are spaced apart along the measuring axis direction at respective locations separated by a distance that is an integer multiple of wavelength $\lambda_2$ of the second pattern track PT2 (=N*$\lambda_2$, where N is an integer), and a second pair of first and second spatial phase crossover segments CRS1 and CRS2 (corresponding to CON1B and CON2B) are spaced apart along the measuring axis direction at respective locations separated by a distance that is an integer multiple of wavelength $\lambda_2$ of the second pattern track PT2 (=N*$\lambda_2$ where N is an integer).

The detector portion 467 additionally includes a third pattern track PT3 arranged along the measuring axis direction MA and including signal modulating elements SME that are arranged to provide a spatially varying characteristic which changes as a periodic function of position along the measuring axis direction. The first pattern track PT1 is arranged between the second pattern track PT2 and the third pattern track PT3. In various exemplary embodiments, the signal modulating elements SME of the third pattern track PT3 are periodically arranged at wavelength $\lambda_2$, which is the same wavelength $\lambda_2$ as the second pattern track PT2.

The field generating coil configuration additionally includes a third-track field generating coil portion FGC3, which defines, by at least partially surrounding, a third interior area INT3 aligned with the third pattern track PT3 and which generates a third-track changing magnetic flux in the third interior area INT3 in response to a coil drive signal supplied to the third-track field generating coil portion FGC3.

The detector portion 467 also includes a third set of sensing elements SEN1-SEN20 configured to provide detector signals which respond to a local effect of the third-track changing magnetic flux provided by adjacent signal modulating elements SME of the third pattern track PT3. The third set of sensing elements SEN1-SEN20 are connected to the second set of sensing elements SEN corresponding to the second pattern track PT2 via spatial phase connection lines CON1A', CON1B', CON2A' and CON2B' including crossover segments CRS3 and CRS4 that extend across or overlap the first pattern track PT1. Those respective crossover segments CRS3 and CRS4 of the spatial phase connection lines CON1A', CON1B', CON2A' and CON2B' are positioned at locations spaced apart along the measuring axis direction MA by a distance that is an integer multiple of wavelength $\lambda_1$ of the first pattern track PT1 (=N*$\lambda_1$, where N is an integer).

Specifically, the third set of sensing elements SEN corresponding to the third pattern track PT3 include a first spatial phase subset of sensing elements SEN1-10 that is connected to the second set of sensing elements SEN corresponding to the second pattern track PT2 via third spatial phase connection lines comprising at least two connection lines CON1A' and CON1B' that include respective crossover segments CRS3 that extend across or overlap the first pattern track PT1. The third set of sensing elements SEN also include a second spatial phase subset of sensing elements SEN11-20 that is connected to the second set of sensing elements SEN corresponding to the second pattern track PT2 via fourth spatial phase connection lines comprising at least two connection lines CON2A' and CON2B' that include respective crossover segments CRS4 that extend across or overlap the first pattern track PT1. A first pair of first and second spatial phase crossover segments CRS1' and CRS2' (corresponding to CON1A' and CON2A') are spaced apart along the measuring axis direction at respective locations separated by a distance that is an integer multiple of wavelength $\lambda_1$ of the first pattern track PT1 (=$N*\lambda_1$, where N is an integer), and a second pair of first and second spatial phase crossover segments CRS1' and CRS2' (corresponding to CON1B' and CON2B') are spaced apart along the measuring axis direction at respective locations separated by a distance that is an integer multiple of wavelength $\lambda_1$ of the first pattern track PT1 (=$N*\lambda_1$, where N is an integer).

In the illustrated embodiment, the first spatial phase subset SEN1-10 of the third set of sensing elements SEN corresponding to the third pattern track PT3, to which the second set of sensing elements SEN corresponding to the second pattern track PT2 are connected (via CON1A' and CON1B'), are connected to the signal processing configuration via detector signal output connections SDS5 and SDS6, and the second spatial phase subset SEN11-20 of the third set of sensing elements SEN corresponding to the third pattern track PT3, to which the second set of sensing elements SEN corresponding to the second pattern track PT2 are connected (via CON2A' and CON2B'), are connected to the signal processing configuration via detector signal output connections SDS7 and SDS8

Such detector portion 467 is configured to be mounted proximate to the first pattern track PT1, the second pattern track PT2 and the third pattern track PT3 and to move along the measuring axis direction MA relative to the first pattern track PT, the second pattern track PT2 and the third pattern track PT3.

In some implementations, the encoder as described in FIG. 5A may be configured as a quadrature encoder. Specifically, the first set of sensing elements SEN corresponding to the first pattern track PT1 may additionally include a third spatial phase subset of sensing elements SEN (not shown) that is connected to the signal processing configuration via connection lines that include at least a third pair of connection lines CON3A and CON3B that include respective crossover segments CRS3 that extend across or overlap the second pattern track PT2, and those respective crossover segments CRS3 are positioned at locations spaced apart along the measuring axis direction at respective locations separated by a distance that is an integer multiple of wavelength $\lambda_2$ of the second pattern track PT2 (=$N*\lambda_2$, where N is an integer). Additionally, the first set of sensing elements SEN corresponding to the first pattern track PT1 may additionally include a fourth spatial phase subset of sensing elements SEN (not shown) that is connected to the signal processing configuration via connection lines that include at least a fourth pair of connection lines CON4A and CON4B that include respective crossover segments CRS4 that extend across or overlap the second pattern track PT2, and those respective crossover segments CRS4 are positioned at locations spaced apart along the measuring axis direction at respective locations separated by a distance that is an integer multiple of wavelength $\lambda_2$ of the second pattern track PT2 (=$N*\lambda_2$ where N is an integer).

For example, the first spatial phase connection lines CON1A and CON1B may correspond to 0°, the second spatial phase connection lines CON2A and CON2B may correspond to 180° phase receiver lines, the third spatial phase connection lines CON3A and CON3B may correspond to 90° phase receiver lines, and the fourth spatial phase connection lines CON4A and CON4B may correspond to 270° phase receiver lines of a quadrature encoder. Similarly, the second set of sensing elements SEN corresponding to the second pattern track PT2 may additionally include a third spatial phase subset of sensing elements SEN and a fourth spatial phase subset of sensing elements SEN arranged in an analogous manner to the first set of sensing elements.

As illustrated in FIG. 5A, in various implementations, the first pattern track PT1 may include two sub-tracks PT1A and PT1B each including signal modulating elements SME that are arranged to provide a spatially varying characteristic which changes as a periodic function of position along the measuring axis direction MA. In various implementations, the signal modulating elements SME of both of the two sub-tracks PT1A and PT1B are periodically arranged at the wavelength $\lambda_1$, and in further various implementations the same signal modulating elements SME are used to form both of the two sub sub-tracks PT1A and PT1B. The two sub-tracks PT1A and PT1B in the illustrated embodiment are offset relative to each other by a nominal scale track offset OFF of approximately $\frac{1}{2}*\lambda_1$ along the measuring axis direction MA.

The first-track field generating coil portion FGC1 includes two sub-coils FGC1A and FGC1B, each of which defines, by at least partially surrounding, a sub-interior area INT1A or INT1B aligned with the corresponding sub-track PT1A or PT1B and each of which generates a sub-track changing magnetic flux in the sub-interior area in response to a coil drive signal.

The first set of sensing elements SEN include two sub-sets each configured to provide detector signals which respond to a local effect on the sub-track changing magnetic flux provided by adjacent signal modulating elements of the sub-track PT1A or PT1B.

FIG. 5B illustrates one configuration of the two sub-coils FGC1A and FGC1B, each corresponding to a sub-set of sensing elements SEN1-SEN24, which may be used with the signal modulation elements SME arranged in two sub-tracks PT1A and PT1B both having the wavelength of $\lambda_1$. The configuration illustrated in FIG. 5B may be used to form the first pattern track PT1 and the corresponding part of the detector portion 467 of FIG. 5A. An enlarged section of the configuration is illustrated in the lower portion of FIG. 5B. Specifically, the first pattern track PT1 includes two sub-tracks PT1A and PT1B, each including signal modulating elements SME periodically arranged at the wavelength $\lambda_1$. In various embodiments, the same SME may be used to form each of the two sub-tracks PT1A and PT1B. The two sub-tracks PT1A and PT1B of the first pattern track PT1 are offset by a nominal scale track offset OFF of approximately $\frac{1}{2}*\lambda_1$ along the measuring axis direction MA relative to each other. The first-track field generating coil portion FGC1 includes two sub-coils FGC1A and FGC1B, each of which defines, by at least partially surrounding, a sub-interior area INT1A or INT1B aligned with the corresponding sub-track PT1A or PT1B and each of which generates a sub-track changing magnetic flux in the sub-interior area INT1A or INT1B in response to a coil drive signal. In the illustrated embodiment, the two sub-coils FGC1A and FGC1B respectively include first and second connection portions CP1 and CP2 that connect a coil drive signal from a signal processing configuration (e.g., the signal processing configuration 166 of FIG. 1 or the signal processing configuration 766 of FIG. 6, etc.) to the two sub-coils FGC1B and FGC1A, respectively. The first and second connection portions CP1 and CP2 may be connected to the signal processing configuration through printed circuit board feedthroughs or the like. The first set of sensing elements SEN1-SEN24 are arranged along the x-axis direction (e.g., corresponding to the measuring axis direction MA) and are fixed on the substrate (e.g., PCB 162 of FIG. 1). The first set of sensing elements SEN1-SEN24 include two sub-sets SEN-A and SEN-B (see the enlarged section in the lower portion of FIG. 5B) each configured to provide detector signals which respond to a local effect on the sub-track changing magnetic flux provided by adjacent signal modulating elements of the corresponding sub-track PT1A or PT1B. In the example of FIG. 5B, each of the sensing elements SEN (which is a combination of the two sub-sets of the sensing elements SEN) has a nominal sensing element width dimension NSEWD along the y-axis direction, which spans at least the corresponding interior area INT1 (which is a combination of the two sub-interior area INT1A and INT1B in FIG. 5B) having an overall interior area width OIAWD.

In various implementations, as shown in FIG. 5B (and in FIG. 5C to be described below), conductive receiver loops (SEN) configured to provide a first sensing loop polarity (e.g., that responds to a changing magnetic flux of a first polarity to produce a current in first direction) are interleaved along the x-axis direction with conductive receiver loops (SEN) configured to provide a second sensing loop polarity opposite to the first sensing loop polarity (e.g., that responds to a changing magnetic flux opposite to the first polarity to produce a current in the same direction). A signal processing configuration may be operably connected to the detector portion to provide the coil drive signal and determine the relative position between the detector portion and the scale pattern based on detector signals input from the illustrated sensing elements SEN (and from other non-illustrated sensing elements SEN provided at other spatial phase positions, according to known principles) of the detector portion, according to known methods.

As indicated by the current flow arrows in FIG. 5B, the two sub-coils FGC1A and FGC1B are configured to generate, respectively, the sub-track changing magnetic flux with a first polarity and the sub-track changing magnetic flux with a second polarity opposite to the first polarity, in the two sub-interior areas INT1A and INT1B, respectively. At least a majority of the conductive receiver loops that form the first set of sensing elements SEN1-SEN24 each spans the two sub-interior areas INT1A and INT1B along a direction perpendicular to the measuring axis direction MA and provide the same sensing loop polarity in the two sub-interior areas INT1A and INT1B.

Since the generated magnetic flux polarity within the first sub-interior area INT1A is opposite to the generated magnetic flux polarity within the second sub-interior area INT1B, this interacts with the signal modulating elements SME having the scale track offset OFF of approximately $\lambda_1/2$ in the first and second sub-tracks PT1A and PT1B to produce reinforcing signal contributions in each of the sensing elements SEN. As such, the configuration of FIG. 5B provides additional advantages with regard to providing more robust signal accuracy and or signal strength in comparison to previously described implementations.

FIG. 5C is a plan view diagram illustration of another configuration of the two sub-coils FGC1A and FGC1B, each corresponding to a sub-set of sensing elements SEN1-SEN24, which may be used with the signal modulation elements SME arranged in two sub-tracks PT1A and PT1B both having the wavelength of $\lambda_1$. As with the configuration illustrated in FIG. 5B, the configuration illustrated in FIG. 5C may be used to form the first pattern track PT1 and the corresponding part of the detector portion 467 of FIG. 5A. This configuration has characteristics and components similar to the configuration illustrated in FIG. 5B above and may be understood to operate similarly, except as otherwise indicated below.

Specifically, as indicated by the current flow arrows in FIG. 5C, the two sub-coils FGC1A and FGC1B are configured to generate, respectively, the sub-track changing magnetic flux with a first polarity and the sub-track changing magnetic flux with a second polarity that is the same as the first polarity, in the two sub-interior areas INT1A and INT1B, respectively. Related to this difference from FIG. 5B, the conductor receiver loops forming SEN in FIG. 5C each include a cross over or twisting TWS of their conductive traces to provide opposite sensing loop polarities in the first sub-interior area INT1A and second sub-interior area INT1B. Specifically, at least a majority of the conductive receiver loops that form the first set of sensing elements SEN each spans the two sub-interior areas INT1A and INT1B along a direction perpendicular to the measuring axis direction MA to have a nominal sensing element width dimension NSEWD, and include the cross over or twisting TWS of their conductive traces to provide opposite sensing loop polarities in the two sub-interior areas INT1A and INT1B, respectively. In various implementations, for at least a majority of the conductive receiver loops that form the first set of sensing elements SEN, the cross over or twisting TWS of their conductive traces is located in or over an "inactive" central region between the two sub-interior areas INT1A and INT1B, to avoid creating an undesirable signal disturbance.

As shown in FIG. 5C, the conductive receiver loops of the sensing elements SEN are configured to have opposite sensing loop polarities interleaved along the x-axis direction (e.g., as schematically indicated by one exemplary sensing loop conductor diagram and the associated current flow arrows shown in the expanded section in the lower portion of FIG. 5C.)

According to the description above, since the generated magnetic flux polarity within the first sub-interior area INT1A is the same as the generated magnetic flux polarity within the second sub-interior area INT1B, this interacts with the signal modulating elements SME having the scale track offset OFF of approximately $\lambda_1/2$ in the first and second sub-tracks PT1A and PT1B to produce reinforcing signal contributions in each of the "twisted" sensing elements SEN.

A two-track scale pattern used in combination with field generation polarities and sensing element polarities similar to those described above with reference to FIGS. 5B and 5C may help reduce or eliminate certain signal offset components that may otherwise arise in single track scale pattern configurations, as disclosed without reference to detailed fabrication or layout consideration in the '958 patent that is previously incorporated herein by reference.

Figure 6:
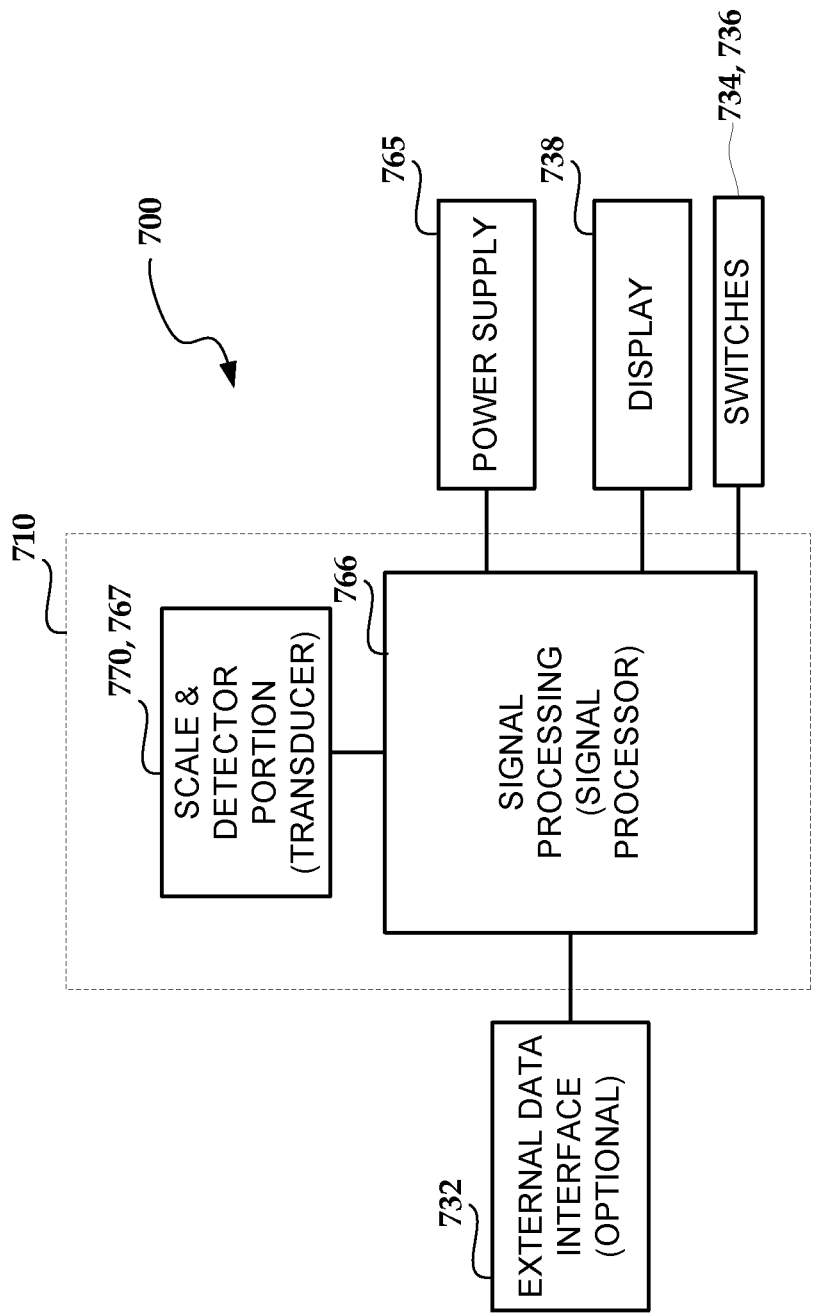
FIG. 6 is a block diagram illustrating one exemplary implementation of components of a measurement system including an electronic position encoder.

FIG. 6 is a block diagram illustrating one exemplary implementation of components of a measurement system 700 including an electronic position encoder 710. It will be appreciated that certain numbered components 7XX of FIG. 6 may correspond to and/or have similar operations as similarly numbered components 1XX of FIG. 1, except as otherwise described below. The electronic position encoder 710 includes a scale 770 and a detector portion 767, which together form a transducer, and a signal processing configuration 766. In various implementations, the detector portion 767 may include any of the configurations described above with respect to FIGS. 2A-5C, or other configurations. The measurement system 700 also includes user interface features such as a display 738 and user-operable switches 734 and 736, and may additionally include a power supply 765.

In various implementations, an external data interface 732 may also be included. All of these elements are coupled to the signal processing configuration 766 (or signal processing and control circuit), which may be embodied as a signal processor. The signal processing configuration 766 determines a position of the sensing elements of the detector portion 767 relative to the scale 770 based on detector signals input from the detector portion 767.

In various implementations, the signal processing configuration 766 of FIG. 6 (and/or the signal processing configuration 166 of FIG. 1) may comprise or consist of one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

As one example, it will be appreciated that the signal modulating elements SME may comprise loop elements or plate elements, or material property variation, in various implementations. As another example, it will be appreciated that various features and principles disclosed herein may be applied to rotary position encoders, wherein a circular measuring axis direction and a radial direction are analogous to the x-axis direction and y-axis direction referred to in the description above.

The various implementations and features described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. An electronic position encoder usable to measure a relative position between two elements along a measuring axis direction, the electronic position encoder comprising:

a scale extending along the measuring axis direction and including a signal modulating scale pattern including at least a first pattern track and a second pattern track arranged along the measuring axis direction, each pattern track including signal modulating elements that are arranged to provide a spatially varying characteristic which changes as a periodic function of position along the measuring axis direction;

a detector portion configured to be mounted proximate to the first pattern track and the second pattern track and to move along the measuring axis direction relative to the first pattern track and the second pattern track, the detector portion including a multi-layer printed circuit board (PCB), which includes:

a field generating coil configuration fixed on the PCB, including:

a first-track field generating coil portion, which defines, by at least partially surrounding, a first interior area aligned with the first pattern track and which generates a first-track changing magnetic flux in the first interior area in response to a coil drive signal, and a second-track field generating coil portion, which defines, by at least partially surrounding, a second interior area aligned with the second pattern track and which generates a second-track changing magnetic flux in the second interior area in response to a coil drive signal, and a plurality of sensing elements including respective conductive receiver loops arranged along the measuring axis direction and fixed on the PCB in alignment with the first and second interior areas, wherein the plurality of sensing elements include:

a first set of sensing elements configured to provide detector signals which respond to a local effect on the first-track changing magnetic flux provided by adjacent signal modulating elements of the first pattern track, and a second set of sensing elements configured to provide detector signals which respond to a local effect on the second-track changing magnetic flux provided by adjacent signal modulating elements of the second pattern track; and a signal processing configuration that is operably connected to the detector portion to provide the coil drive signal and that determines the relative position between the detector portion and the scale based on detector signals input from the detector portion, wherein:

the first pattern track includes signal modulating elements periodically arranged at a wavelength $\lambda_1$ along the measuring axis direction;

the second pattern track includes signal modulating elements periodically arranged at a wavelength $\lambda_2$ along the measuring axis direction;

the first set of sensing elements are connected to the signal processing configuration via connection lines which include crossover segments that extend across or overlap the second pattern track;

the first set of sensing elements include a first spatial phase subset of sensing elements that is connected to the signal processing configuration via first spatial phase connection lines and a second spatial phase subset of sensing elements that is connected to the signal processing configuration via second spatial phase connection lines; and the first spatial phase connection lines comprise at least two connection lines that include respective first spatial phase crossover segments that extend across or overlap the second pattern track, and the second spatial phase connection lines comprise at least two connection lines that include respective second spatial phase crossover segments that extend across or overlap the second pattern track, and a first pair of first and second spatial phase crossover segments are spaced apart along the measuring axis direction at respective locations separated by a distance $N*\lambda_2$, where N is an integer, and a second pair of first and second spatial phase crossover segments are spaced apart along the measuring axis direction at respective locations separated by a distance $N*\lambda_2$ where N is an integer.

2. The electronic position encoder of claim 1, wherein:
the first-track field generating coil portion and the second-track field generating coil portion are part of a single loop which defines both the first interior area and the second interior area.

3. The electronic position encoder of claim 1, wherein:
the scale additionally includes a third pattern track arranged along the measuring axis direction and including signal modulating elements that are arranged to provide a spatially varying characteristic which changes as a periodic function of position along the measuring axis direction, wherein the first pattern track is arranged between the second pattern track and the third pattern track;
the detector portion is configured to be mounted proximate to the first pattern track, the second pattern track and the third pattern track and to move along the measuring axis direction relative to the first pattern track, the second pattern track and the third pattern track;
the field generating coil configuration additionally includes a third-track field generating coil portion, which defines, by at least partially surrounding, a third interior area aligned with the third pattern track and which generates a third-track changing magnetic flux in the third interior area in response to a coil drive signal;
the plurality of sensing elements are arranged along the measuring axis direction in alignment with the first, second and third interior areas, wherein the plurality of sensing elements additionally include a third set of sensing elements configured to provide detector signals which respond to a local effect of the third-track changing magnetic flux provided by adjacent signal modulating elements of the third pattern track;
the third pattern track includes signal modulating elements periodically arranged at a wavelength $\lambda_3$ along the measuring axis direction; and
the third set of sensing elements are connected to the signal processing configuration via connection lines.

4. The electronic position encoder of claim 1, wherein:
the scale additionally includes a third pattern track arranged along the measuring axis direction and including signal modulating elements that are arranged to provide a spatially varying characteristic which changes as a periodic function of position along the measuring axis direction, wherein the first pattern track is arranged between the second pattern track and the third pattern track;
the detector portion is configured to be mounted proximate to the first pattern track, the second pattern track and the third pattern track and to move along the measuring axis direction relative to the first pattern track, the second pattern track and the third pattern track;
the field generating coil configuration additionally includes a third-track field generating coil portion, which defines, by at least partially surrounding, a third interior area aligned with the third pattern track and which generates a third-track changing magnetic flux in the third interior area in response to a coil drive signal;
the plurality of sensing elements are arranged along the measuring axis direction in alignment with the first, second and third interior areas, wherein the plurality of sensing elements additionally include a third set of sensing elements configured to provide detector signals which respond to a local effect of the third-track changing magnetic flux provided by adjacent signal modulating elements of the third pattern track;
the third pattern track includes signal modulating elements periodically arranged at a wavelength $\lambda_2$ along the measuring axis direction;
the third set of sensing elements are connected to the second set of sensing elements via connection lines which include crossover segments that extend across or overlap the first pattern track;
the third set of sensing elements include a first spatial phase subset of sensing elements that is connected to the second set of sensing elements via third spatial phase connection lines and a second spatial phase subset of sensing elements that is connected to the second set of sensing elements via fourth spatial phase connection lines; and
the third spatial phase connection lines comprise at least two connection lines that include respective first spatial phase crossover segments that extend across or overlap the first pattern track, and the fourth spatial phase connection lines comprise at least two connection lines that include respective second spatial phase crossover segments that extend across or overlap the first pattern track, and a first pair of first and second spatial phase crossover segments are spaced apart along the measuring axis direction at respective locations separated by a distance $N*\lambda_1$, where N is an integer, and a second pair of first and second spatial phase crossover segments are spaced apart along the measuring axis direction at respective locations separated by a distance $N*\lambda_1$, where N is an integer.

5. The electronic position encoder of claim 4, wherein:
the first pattern track includes two sub-tracks each including signal modulating elements that are arranged to provide a spatially varying characteristic which changes as a periodic function of position along the measuring axis direction;
the two sub-tracks of the first pattern track are offset by a nominal scale track offset of approximately $\frac{1}{2}*\lambda_1$ along the measuring axis direction;
the first-track field generating coil portion includes two sub-coils, each of which defines, by at least partially surrounding, a sub-interior area aligned with the corresponding sub-track and each of which generates a sub-track changing magnetic flux in the sub-interior area in response to a coil drive signal; and
the first set of sensing elements include two sub-sets each configured to provide detector signals which respond to a local effect on the sub-track changing magnetic flux provided by adjacent signal modulating elements of the sub-track.

6. The electronic position encoder of claim 5, wherein:
the two sub-coils are configured to generate, respectively, the sub-track changing magnetic flux with a first polarity and the sub-track changing magnetic flux with a second polarity opposite to the first polarity, in the two sub-interior areas, respectively; and
at least a majority of the conductive receiver loops that form the first set of sensing elements each spans the two sub-interior areas along a direction perpendicular to the measuring axis direction and provide the same sensing loop polarity in the two sub-interior areas.

7. The electronic position encoder of claim 5, wherein:
the two sub-coils are configured to generate, respectively, the sub-track changing magnetic flux with a first polarity and the sub-track changing magnetic flux with a second polarity that is the same as the first polarity, in the two sub-interior areas, respectively; and
at least a majority of the conductive receiver loops that form the first set of sensing elements each spans the two sub-interior areas along a direction perpendicular to the measuring axis direction and include a cross over or twisting of their conductive traces to provide opposite sensing loop polarities in the two sub-interior areas, respectively.

8. The electronic position encoder of claim 7, wherein for at least a majority of the conductive receiver loops that form the first set of sensing elements, the cross over or twisting of their conductive traces is located in a region between the two sub-interior areas.

9. The electronic position encoder of claim 1, wherein the first-track field generating coil portion and the second-track field generating coil portion each includes a single turn that at least partially surrounds the first interior area and the second interior area, respectively.

10. The electronic position encoder of claim 1, wherein:
at least a majority of the respective conductive receiver loops have a nominal sensing element width dimension along a direction perpendicular to the measuring axis direction that spans the corresponding interior area.

11. The electronic position encoder of claim 10, wherein:
the nominal sensing element width dimension is greater than a dimension across the corresponding interior area along the direction perpendicular to the measuring axis direction; and
at least a majority of the conductive receiver loops overlap the corresponding field generating coil portion.

12. The electronic position encoder of claim 1, wherein the respective crossover segments that extend across or overlap the second pattern track are straight line segments that are oriented perpendicular to the measuring axis direction.

* * * * *